Nov. 25, 1924.

G. CONSTANTINESCO 1,516,882

MEANS FOR PREVENTING BREAKAGE DUE TO RESONANCE IN HIGH SPEED MACHINERY

Filed Aug. 30 1923      4 Sheets-Sheet 1

Inventor
G. Constantinesco

Atty

Nov. 25, 1924.
G. CONSTANTINESCO
1,516,882

MEANS FOR PREVENTING BREAKAGE DUE TO RESONANCE IN HIGH SPEED MACHINERY

Filed Aug. 30, 1923   4 Sheets-Sheet 2

Inventor
G. Constantinesco

Atty

Nov. 25, 1924.

G. CONSTANTINESCO 1,516,882

MEANS FOR PREVENTING BREAKAGE DUE TO RESONANCE IN HIGH SPEED MACHINERY

Filed Aug. 30, 1923     4 Sheets-Sheet 3

Inventor
G. Constantinesco
Atty

Nov. 25, 1924.  G. CONSTANTINESCO  1,516,882

MEANS FOR PREVENTING BREAKAGE DUE TO RESONANCE IN HIGH SPEED MACHINERY

Filed Aug. 30  1923    4 Sheets-Sheet 4

Inventor
G. Constantinesco
Atty

Patented Nov. 25, 1924.

1,516,882

UNITED STATES PATENT OFFICE.

GEORGE CONSTANTINESCO, OF WEYBRIDGE, ENGLAND.

MEANS FOR PREVENTING BREAKAGE DUE TO RESONANCE IN HIGH-SPEED MACHINERY.

Application filed August 30, 1923. Serial No. 660,262.

*To all whom it may concern:*

Be it known that I, GEORGE CONSTANTINESCO, a subject of the King of Great Britain and Ireland, residing at "Carmen Sylva," Beechwood Avenue, Oatlands Park, Weybridge, in the county of Surrey, England, have invented certain new and useful Improvements in Means for Preventing Breakage Due to Resonance in High-Speed Machinery, of which the following is a specification.

The present invention relates to gear wheels.

The object of the invention is to build up such wheels in such a manner that vibration due to resonance and other causes is damped out and converted into heat within the structure.

The present invention is especially applicable to machines in which masses of metal rotate or oscillate at high speed; for example, the gear employed between turbines and the propeller in vessels driven by geared turbine installations.

In geared turbine installations, particularly in cases in which double reduction gearing is employed between a turbine and a propeller shaft, considerable difficulty has arisen owing to pitting and breakage of the gear teeth, although the normal stresses to which these teeth are subjected are apparently well within the limits allowable without over-stressing the metal. The cause of these breakages has hitherto been extremely obscure and breakages have usually been considered to be due to inaccuracy of cutting, quality of metal, or to excessive fatigue of the metal.

I have found, however, that the failure in many cases is due to high frequency vibrations of the teeth of the gears which at certain speeds of rotation are set into vibration at their natural frequency which may be in resonance with the impulses given by the teeth of the intermeshing wheels coming into contact as the gears rotate.

In a single reduction gear where the pinion is in direct connection with the shaft of the turbine and the gear wheel is fixed on the propeller shaft, this failure is less likely to occur, as in such case there is ample provision for the dissipation of the energy of vibration from the body of the wheel along the propeller shaft or to the shaft of the turbine, so that the energy of vibration may be dissipated and there is no storage of an excessive amount of energy in the vibration of the teeth of the gears.

On the other hand, in a double reduction gearing, the intermediate pinion and gear wheel are practically isolated for the supersonic vibrations because the only contact with radiating masses is on the bearings. The oil film maintained in the bearings acts as a most perfect insulator for very high frequency vibrations with the consequence that the energy of vibration due to supersonic vibration may continually increase if resonance should occur, as it will do in most cases at a given speed of rotation. The continually accumulated energy in the form of supersonic vibration ultimately results in damage to the teeth, because the increase of amplitude of vibration in the teeth results in alternating deformations of the metal beyond the elastic limit and also the high amplitude of the alternating vibration produces between the teeth impulsive pressures or shocks which may greatly exceed the surface resistance of the metal of the teeth, so that destruction of the surface occurs at the point of impact. This results in failure of the teeth which may be a clean breakage at the base due to the amplitude of the oscillation of the teeth and/or pitting and surface damage in the form of scaling; and pieces of hard steel may fly off owing to the excessive amplitude of the vibration and excessive relative velocity of impact.

One object of the present invention is to construct one or more of the gear wheels of a single or double reduction gear or other machinery in which a similar phenomenon occurs in such a manner that the energy of vibration is taken up in internal friction in the mass of the metal and carried away in the form of heat.

The invention also consists in constructing a gear wheel or other body, in which the vibration occurs, in the form of laminations bolted together in such a way that the stresses produced on the laminations result finally in relative shearing force in the direction to cause slip one over the other, so that the energy of impact in the moment of application of the stress is taken up in internal molecular friction of the material amalgamating the surfaces of the various laminations and dissipated in the form of heat, thus avoiding the occurrence of high frequency vibrations which may be termed supersonic energy in the material.

The invention further consists in constructing a member subject to intense vibration in the form of a number of thin laminations amalgamated together so that the energy generated by shock between hard metallic surfaces is immediately converted into heat by internal friction and providing means whereby the heat so generated by internal friction is carried away and overheating avoided. In most cases the natural radiation will be sufficient to carry away the heat.

The invention also consists in constructing a gear wheel or the like by stamping or otherwise forming a number of thin steel sheets, immersing these in a bath of molten tin, lead or other alloy, or galvanizing them with a suitable metal, assembling the various plates so formed and subjecting them to pressure and heat in a suitable jig, cooling the blank so formed under pressure, and in the case of a gear wheel, shrinking the ring so formed on to a wheel casting, bolting the whole together; and finally cutting the teeth in the known manner.

The invention consists in a gear wheel built up of laminæ of metal such as steel having between them and amalgamated with them a thin layer of a second metal capable of forming an amalgam with said first metal, the intermediate metal being such that it is capable of taking up energy by internal friction or hysteresis and converting it into heat, the laminæ being so disposed that under the forces which act on the wheel, there is a tendency for the laminæ to slip one over the other.

The invention also consists in a gear wheel formed of a number of laminæ of steel having between them and amalgamated with them a metal such as tin, the planes of the laminæ being inclined to the direction in which the forces act on the teeth of the wheel so that there is a tendency for the laminæ to slip one over the other when the wheel is in operation.

The invention also consists in the improved means for avoiding breakage in gear wheels liable to resonance when running at high speeds hereinafter described.

In carrying the invention into effect according to one example as applied to the intermediate gear wheel in a double reduction gear between a turbine and a propeller shaft of a ship propulsion installation, the crowns of the intermediate pinion and gear wheel are constructed of a number of laminated annular plates of high tensile steel of thickness say ½ m/m or even less for small teeth to 3 m/m for very large teeth, according to the size of teeth, firmly bolted together and double helical gears are cut on the wheel blank so formed in the ordinary manner. The surfaces of the laminations may be mechanically or chemically roughened to enable them to adhere and therefore increase the internal friction or a layer of viscous or any friction increasing material in the form of a varnish not soluble in oil and which will not transmit vibration may be interposed between the laminations. For instance, the surfaces may be tinned or covered with very thin coating of lead, copper, or other ductile metal or material.

Suppose for instance it is desired to produce a gear wheel of say 60 inches diameter, the outer ring of the gear wheel is formed of a number of sectors which may be $\frac{1}{16}$ of an inch in thickness, 3 inches in radial depth; and extending circumferentially through an angle of 45 degrees. These separate sectors may be stamped out of sheet-metal with suitable apertures for bolts which should be of rather smaller diameter than the final diameter intended. The sectors are then immersed in a bath of molten tin, lead, or other alloy, or may be galvanized by other suitable metal which is soluble in steel. The several sectors are then assembled in the form of a ring, the adjacent laminations overlapping each other across the width of the blank. Assembly is carried out in a special jig and the blank is then subjected to heat and pressure which causes the whole mass to bind together forming a solid body by reason of the melting of the jointing metal. The blank is then cooled under pressure and removed from the jig for machining. Holes are then formed parallel to the axis and riveting bolts inserted; and the blank is then machined on its inner diameter and shrunk on to a wheel casting which may be of cast iron, steel or other metal. The laminated mass is prevented from rotation on the wheel by a number of bolts parallel to the axis engaged half in the blank and half in the wheel body to take the drive and prevent slip. The teeth are now cut on the circumference of the wheel in the usual manner and finally circular flanges are bolted on to the sides. In such a wheel resonance under vibration either of sound frequency or supersonic frequency is avoided.

It will be found that with a wheel so constructed the energy of vibration will be taken up by the internal friction or hysteresis of the material between the plates; and by the provision of the suitable cooling means, the heat so generated may be carried away and the tendency to high frequency resonance and consequent breakage eliminated.

Referring to the accompanying diagrammatic drawings:—

In the form of the invention shown in Figures 1 to 6, the portion of the wheel on which the teeth are cut comprises a number of annular discs $a$ of steel, hard bronze, or other metal coated with solder or other suitable damping material which has considerable plasticity or hysteresis pressed together when hot as above described. The composite ring so formed is pressed on to the body of the wheel $b$ and held in place by flanged rings $c$ $c$ held together by bolts $d$ $e$. Each disc of the ring $a$ is composed of a number of segments 1, 2, 3 etc., the segments of the adjacent rings being staggered as indicated by dotted lines 4 in Figure 4. With this arrangement, the teeth may be cut at an angle to the axis as illustrated at 5 in Figure 2.

Figure 5:
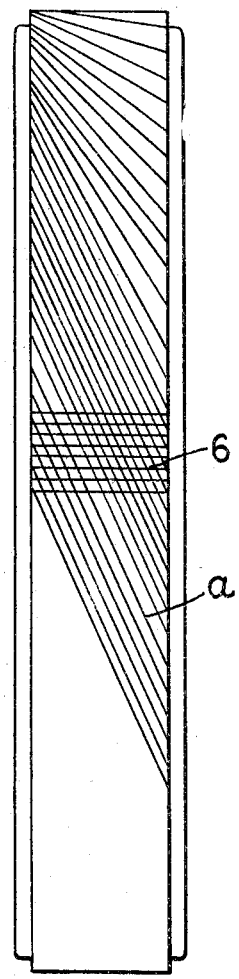
Figure 5 shows a method of forming the laminations when the teeth are cut parallel to the axis of the wheel.

The separate segments of the disc $a$ may also be arranged according to another figure as shown in Figure 5, in which case the teeth 6 of the wheel may be cut parallel to the axis as illustrated.

In applying the invention to a bevel wheel, the portion of the wheel on which the teeth are cut may consist of a tightly wound spiral forming a ring $g$ with suitable damped material being employed as above described between the adjacent spiral. The ring thus formed is pressed on to a suitable hub $h$ and held between a flange $k$ and a plate $l$ firmly bolted to the wheel hub by bolts $m$.

In this form of the invention suitable keys $n$ should be provided on the face of the plate $l$ to assist in the prevention of rotation of the ring $g$ relatively to the hub of the wheel. The teeth of the bevel wheel are indicated by the lines $o$.

Figure 2:
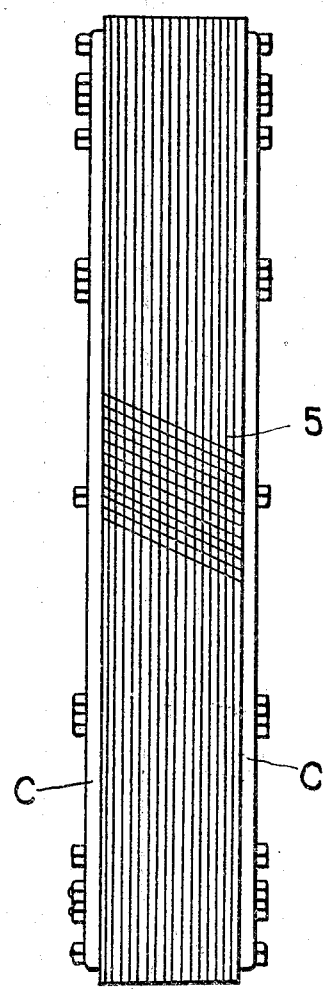
Figure 2 is an edge elevation of the same.
Figure 1:
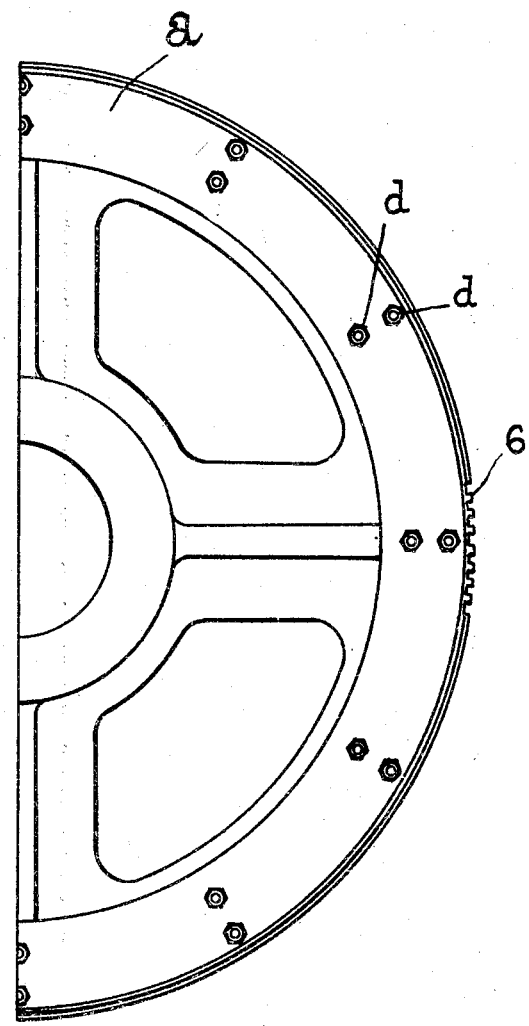
Figure 1 is a side elevation of a pinion constructed according to the invention suitable for helical teeth.
Figure 10:
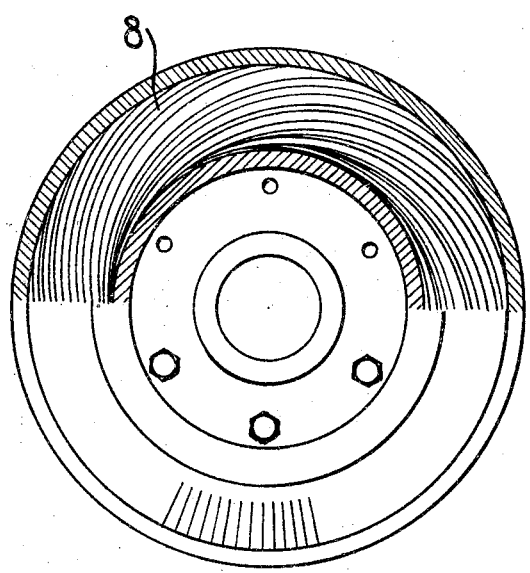
Figure 10 shows a modified form of lamination suitable for a bevel wheel.
Figure 3:
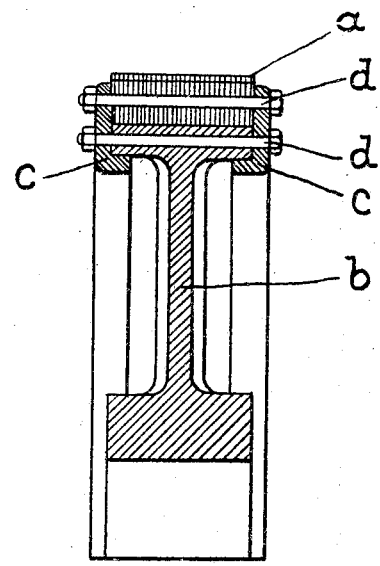
Figure 3 is a section through the rim of the wheel.
Figure 6:
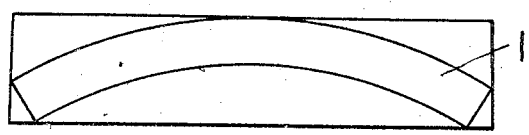
Figure 6 shows one of the laminations.
Figure 4:
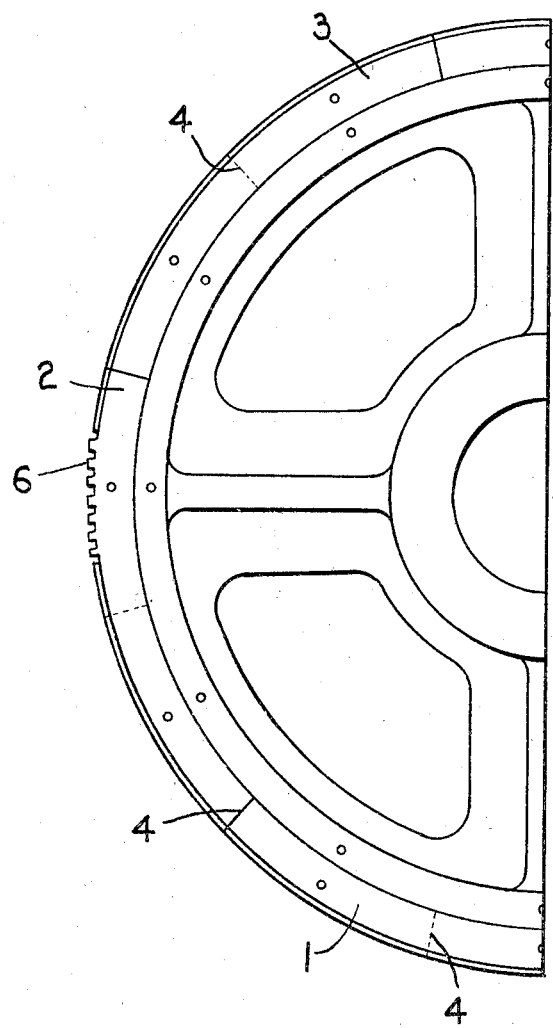
Figure 4 is a side elevation with the side plates of the wheel removed.

In the form of the invention shown in Figure 10 which illustrates another form of bevel wheel, the ring on which the teeth are cut is built up of a number of spiral segments 8 with suitable damping material between them, as above described.

Figure 8:
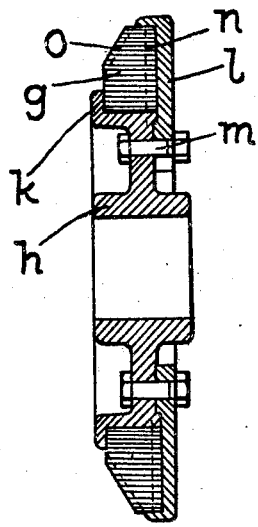
Figure 8 is a section on the line 8—8, Figure 7.
Figure 7:
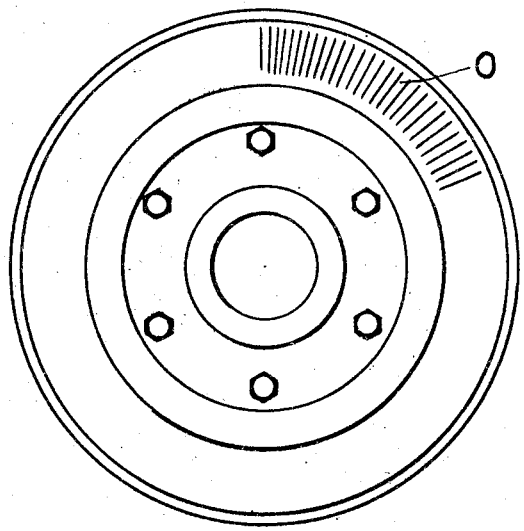
Figure 7 is a side elevation showing laminations suitable for a bevel wheel.
Figure 9:
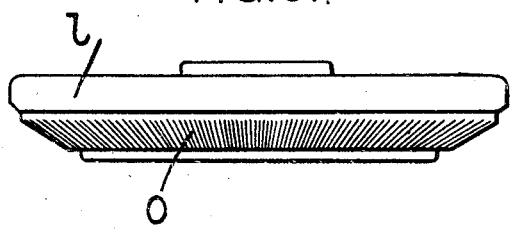
Figure 9 is a plan of the bevel wheel.

In this form of the invention, the teeth may be cut as shown in Figures 7, 8 and 9. It will be obvious that many modifications of the invention are possible and that the wheels illustrated are only examples showing the method by which the invention may be carried into effect.

It will be seen that the invention is more applicable to wheels which are isolated in space from radiating masses such as the intermediate member of a double reduction gear, as in the case of the end members of such gear a portion of the vibration of the teeth can be transmitted either along the turbine shaft or along the propeller shaft and so dissipated without serious damage due to resonance.

In order to prevent exfoliation of the end laminations of the teeth the last laminations can be made very stout, but with such a profile they act only as maintaining flanges and do not take any direct load from the driving teeth.

It should be noted that when the laminations are arranged so that they tend to bend under the application of the load, the relative tendency to slip between them will cause the transformation into heat of a certain amount of the energy of impact and from this it follows that helical gears laminated as above described will be more effective than parallel cut gears of the same size under the same load and speed. Therefore, whenever possible, the laminations should be arranged so that the plane of the laminations shall be inclined to the direction of impact. Figure 5 shows how the laminations should be arranged for parallel teeth. Such an arrangement is also suitable for helical teeth provided the angles of inclination of the teeth and laminations are different.

It should be noted that the steel laminæ are subjected to internal stresses below their elastic limit, the heat being generated chiefly in the intermediary material. In this way the nonhomogeneous structure obtained has high mechanical strength combined with a high hysteresis factor.

The invention does not include cases in which bodies are built up from laminations bolted together without adhering firmly together. Such structures cannot take up internal shearing stresses, the laminæ simply acting individually as is the case with laminated springs or gear wheels built of plates bolted together.

The strength of such bodies formed of a large number of laminæ is very much less than a similar structure solidly built. The difference in strength between the structure built up according to my invention and a solid body is negligible and since better quality of metal may be employed the strength may be even greater than would be the case of a solid structure provided the laminations are suitably arranged in view of the direction of the various stresses which have to be met.

What I claim is:—

1. A gear wheel built up of laminæ of metal such as steel having between them and amalgamated with them a thin layer of a second metal capable of forming an amalgam with said first metal, the intermediate metal being such that it is capable of taking up energy by internal friction or hysteresis and converting it into heat, the laminæ being so disposed that under the forces which act on the steel, there is a tendency for the laminæ to slip one over the other.

2. A gear wheel formed of a number of laminæ of steel having between them and amalgamated with them a metal such as tin, the planes of the laminæ being inclined to the direction in which the forces act on the teeth of the wheel so that there is a tendency for the laminæ to slip one over the other when the wheel is in operation.

In testimony whereof I affix my signature.

GEORGE CONSTANTINESCO.